Oct. 16, 1956   L. O. REICHELT   2,766,993
DEVICE FOR STORING AND TRANSPORTING ARTICLES
Filed June 12, 1954   2 Sheets-Sheet 1

INVENTOR
L. O. REICHELT
BY C. B. Hamilton
ATTORNEY

Oct. 16, 1956     L. O. REICHELT     2,766,993
DEVICE FOR STORING AND TRANSPORTING ARTICLES
Filed June 12, 1954     2 Sheets-Sheet 2
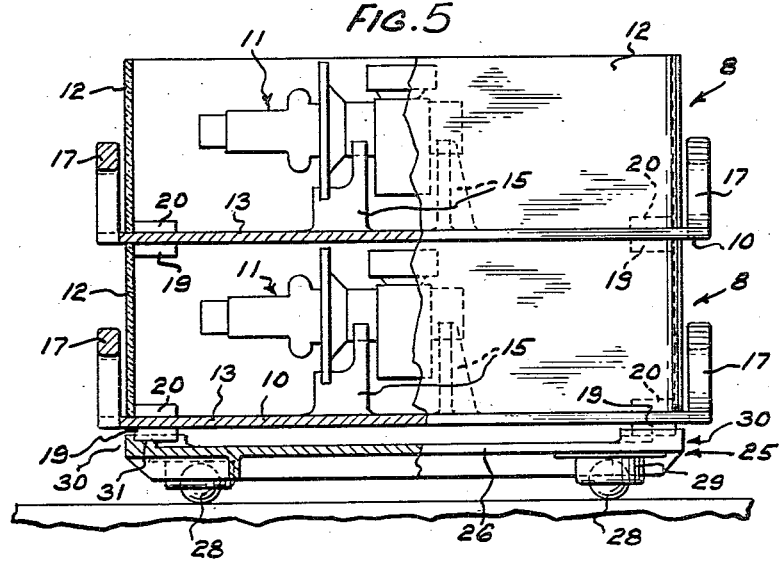
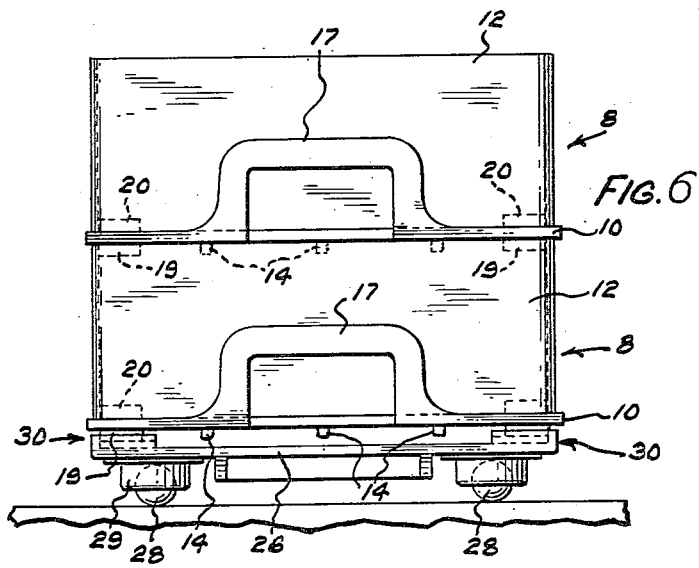
INVENTOR
L. O. REICHELT
BY C. B. Hamilton
ATTORNEY United States Patent Office 2,766,993
Patented Oct. 16, 1956

2,766,993
DEVICE FOR STORING AND TRANSPORTING ARTICLES

Lester O. Reichelt, St. Paul, Minn., assignor to Western Electric Company, Incorporated, New York, N. Y., a corporation of New York Application January 12, 1954, Serial No. 403,604

6 Claims. (Cl. 280—79.1)

This invention relates to a device for supporting articles in transparent and protective enclosures individually or in stacked relation to each other and for movement of the stacked articles, and more particularly to composite and stackable trays for supporting and protecting magnetrons during transport on a carrier on which the lowermost tray is interlocked.

In the manufacture of various types of composite articles such as magnetron electronic tubes, it is desirable that, during various stages of fabrication and between successive assembling and testing operations, the tubes be supported in a manner so that they can be grouped together and be readily available, so that they may be protected to avoid damage thereto, so that they may be visible while thus supported and protected, and so that they may be readily transported in groups from one place to another.

An object of the invention is to provide a device having interfitting components for enclosing and supporting articles individually or in stacked relation to each other.

A further object of the invention is to provide a composite device for enclosing and supporting articles in a stack and for movement of the stack by interlocking it on a carrier.

Another object of the invention is to provide composite trays for supporting and enclosing articles and having transparent components through which the articles may be seen and which trays are capable of being stacked on one another.

A device illustrating certain features of the invention may include a composite tray comprising a flat base component having a seat on the upper face thereof for supporting a magnetron against lateral movement and having handles on opposite ends thereof by means of which the composite tray may be carried. A transparent collar component is removably supported on the base of the tray for enclosing and protecting the magnetron and the collar engages lugs on the upper side of the base which lugs serve to prevent lateral movement of the collar and hold it in place. The collar on a lower tray is adapted to engage the under face of a base component of an upper tray placed upon this collar and to engage lugs on the bottom of the base which lugs prevent relative movement between the base and collar components whereby a plurality of composite trays may be stacked one on another to support a plurality of magnetrons in a vertical row and in a manner in which they are visible through the transparent spacing and supporting collars. A dolly supported on rollers and having seats for receiving the lower lugs on the base component is provided for supporting and retaining a stack of the composite trays and magnetrons for transit.

Other objects and advantages of the invention will become apparent by reference to the following detailed description and the accompanying drawings illustrating a preferred embodiment thereof, in which—

Figs. 5 and 6 are side and end views, respectively, of a stack of composite trays and magnetrons supported on a dolly.

Figure 1:
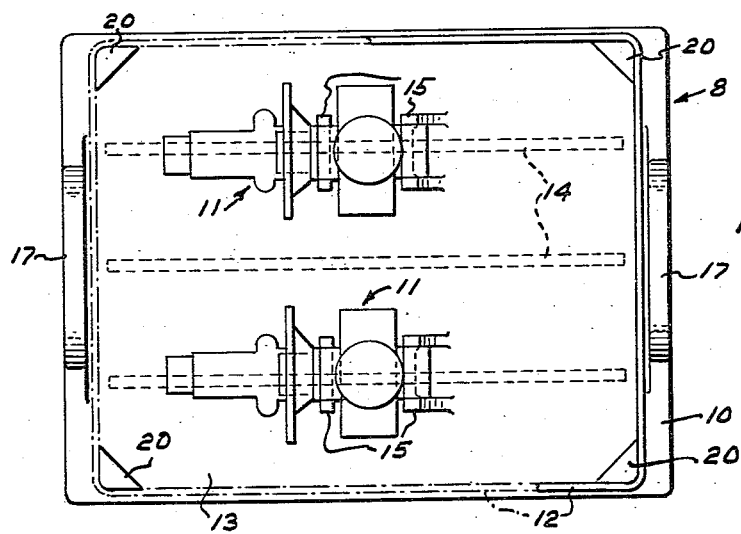
Figs. 1 and 2 are plan and side elevational views, respectively, of a composite tray for supporting an article thereon and showing the tubular spacing collar component thereof in dot and dash lines.
Figure 2:
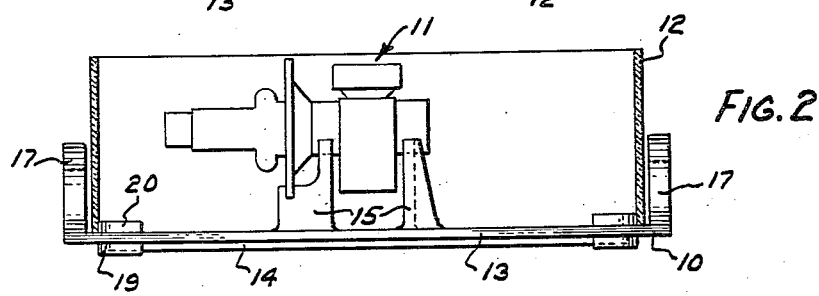
Figure 3:
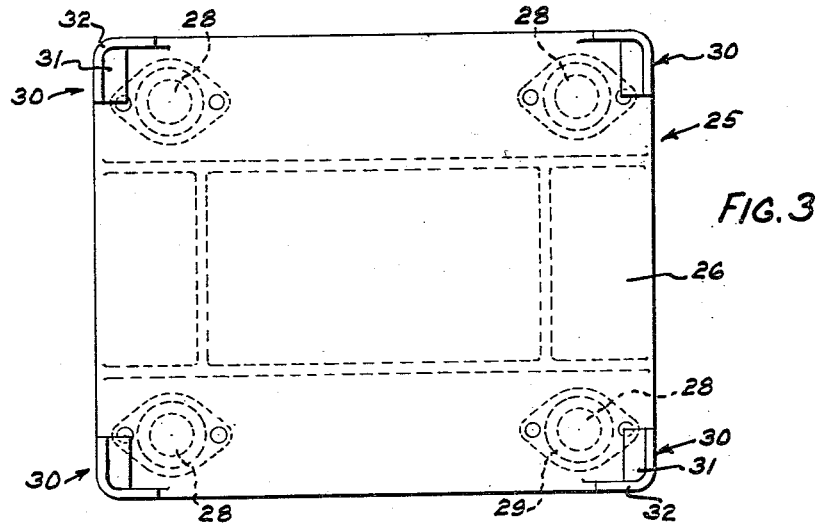
Figs. 3 and 4 are plan and side elevational views, respectively, of a dolly for supporting a stack of the composite trays.
Figure 4:
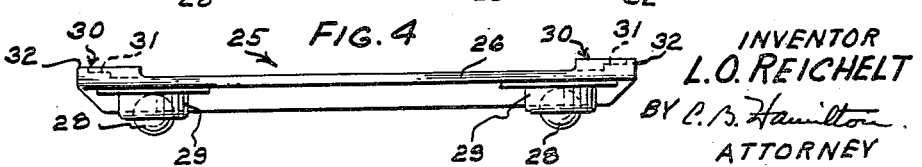

Referring to the drawings, the composite tray 8 comprises a base component 10 on which a magnetron electronic tube 11 is supported and on which a transparent tubular spacing collar component 12 is supported encircling the magnetron. The collar 12 forms a wall surrounding and protecting the magnetron and extends vertically above the magnetron and is adapted to receive and support another composite tray 8 thereon so that the trays 8 may be stacked one on top of another to support a plurality of magnetrons in stacked relation to each other. The protective spacing collars 12 are rectangular in cross section and are made of Plexiglas or other transparent plastic material so that the magnetron may be readily seen within the composite tray while particularly protecting the glass portions of the magnetrons.

The tray base 10 comprises a flat rectangular plate 13 suitably reinforced with a plurality of ribs 14 on the lower face thereof and having a pair of seats or holders 15—15 extending upwardly therefrom for supporting a pair of magnetrons 11 against lateral movement relative to the base. A pair of upwardly directed handles 17 are provided on opposite ends of the base by means of which the tray may be carried about.

A plurality of lower lugs 19 and a plurality of upper lugs 20 are provided on the lower and upper surfaces, respectively, of the tray base in vertically aligned relation to each other and adjacent the corners of the rectangular plate. The upper lugs 20 are adapted to engage the inner surface of the collar 12 in the corners thereof to prevent lateral movement of the spacing collar relative to the base. The bottom lugs 19 serve as feet to support a base 10 and composite tray 8 on a horizontal surface and when a base 10 is placed on a spacing collar 12 of another tray the lower lugs are adapted to fit within the collar and engage the corner portions of the side walls thereof for preventing relative movement between the collar and the base. Thus, the composite trays stacked on one another are held against lateral movement relative to each other.

To permit magnetrons supported in trays 10 to be moved individually or in stacks from one location to another, dollies or carriers 25 are provided, each comprising a flat rectangular plate or platform 26 having a plurality of reinforcing ribs on the lower side thereof and having four spherical rollers 28 mounted for rolling movement in bearing members 29 secured to the underneath side of the plate 26. On the upper side of the plate 26 of the dolly at each of the corners thereof there is provided an interlocking seat 30 for receiving and supporting the under lugs 19 of the tray 10. Each of the seats comprises a raised horizontal surface 31 on which the lugs 19 are adapted to rest and an upwardly extending L-shaped flange 32 engageable with the sides of the lugs 19 for preventing lateral movement of the tray relative to the dolly 25. Thus, when it is desired to move a single magnetron on a tray or a stack of magnetrons from one position to another position for various operations, the trays and the magnetrons singly or in stacks may be placed on dollies 25 and moved to the desired location.

In some instances the base 10 of the tray without the collar 12 serves as a holding fixture for the magnetron 11 while certain operations are performed thereon.

The magnetrons may be placed into the holders 15 of the base component 10 of the composite tray with the collar component 12 in position on the base or removed therefrom as desired, it being apparent that with the collar component removed the holders 15 are more accessible and the magnestrons may be more readily placed thereon and removed therefrom. After one composite tray has been filled with magnetrons, a base component 10 or a complete tray 8 may be placed thereon for receiving two more magnestrons. If only the base is placed on a tray and a pair of magnetrons placed in the holder 15, the collar 12 is then placed on the base and another tray may be added thereon, and successive trays added onto the stack as desired.

It will thus be seen from the above description that a magnetron 11 or a pair thereof may be readily placed in a composite tray 8 and that successive trays and magnetrons added thereon to form a stack of trays and magnetrons in which the magnetrons are grouped in closely spaced relation to each other and are visible through the transparent walls of the tray collars and that the magnetrons are accessible as the trays are successively removed from the top.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A work holder capable of being stacked one on another for protectively enclosing and supporting articles in stacked relation to each other comprising a one piece base having corners and an integral holder extending upwardly therefrom for supporting an article while work is performed thereon, a rigid plastic tubular spacer removably supported on the upper portion of said base for surrounding and protecting the article and engageable with the bottom of another base placed thereon for supporting another work holder, and upstanding lugs at each corner of said base engageable with the inside of said spacers on the upper and the lower portions thereof for preventing movement of said spacers laterally relative to said base.

2. In a composite storing and transporting device for frangible articles, one piece trays having integral holders for supporting the articles, each tray having corners and upper and lower lugs thereon at each corner, protective collars for surrounding the articles on the trays and for engaging the upper and the lower portions of the trays and the outside of the lugs, so that the trays with the articles and their protective collars may be interlocked in stacked relationship, and a movable platform having seats engageable with the lower lugs on the lowermost tray to support and transport the stack of trays with their articles and protective collars.

3. A composite tray capable of being stacked one on another for enclosing and supporting articles in stacked relation to each other comprising a one piece base having an integral holder extending upwardly therefrom for supporting an article, a transparent tubular spacer removably supported on the upper portion of said base for surrounding and protecting the article and engageable with the bottom of another base placed thereon for supporting another composite tray, projections on the upper and lower sides of said base in spaced relation to the edges thereof engageable with inner portions of the spacers disposed on the upper and the lower sides thereof for preventing movement of said spacers laterally relative to said base, and handles on each end of said base and outside of the tubular spacers to permit carrying any desired number of stacked trays without disturbing the other trays.

4. A composite tray capable of being stacked one on another for enclosing and supporting articles in stacked relation to each other comprising a relatively flat one piece base having an integral holder on the upper face thereof for supporting an article against lateral movement, tubular spacer removably supported on the upper face of said base for surrounding and protecting the article and engageable with the bottom face of the base of another tray placed thereon for supporting said other tray, lugs on the upper face of said base engageable with the inside of said removable spacer for preventing lateral movement thereof relative to the base, and lugs on the bottom face of said base aligned with the lugs on the upper face and engageable with a spacer on which said base is supported for preventing lateral movement of the base relative to said spacer.

5. A composite tray and work holder capable of being stacked one on another for enclosing and supporting articles in stacked relation to each other comprising a rigid relatively flat base having corners and a holder on the upper face thereof for supporting an article against lateral movement, a rigid tubular spacer removably supported on the upper face of said base for surrounding and protecting the article and engageable with the bottom face of the base of another tray placed thereon for supporting said other tray, projections on the upper face of said base in spaced relation to the edges and adjacent to the corners thereof engageable with inner portions of said removable spacer for preventing lateral movement thereof relative to the base, projections on the bottom face of said base in spaced relation to the edges and adjacent the corners thereof for supporting said base on a horizontal surface and engageable with inner portions of a spacer on which said base may be supported for preventing lateral movement of the base relative to said spacer, and handles on said base disposed outside the spacers when the trays are stacked.

6. A device for supporting articles in a stack and for movement of the stacked articles comprising a plurality of composite trays capable of being stacked one on another, each of said trays including a one piece flat base having a holder on the upper face thereof for supporting an article against lateral movement, a transparent tubular spacer component removably supported on the upper face of said base for surrounding and protecting the article, said spacer being engageable with the bottom face of the base of another tray placed thereon for supporting said tray, projections on the top of said base in spaced relation to the edges thereof and engageable with inner portions of said removable spacer for preventing lateral movement thereof relative to the base, projections on the bottom of said base in spaced relation to the edges thereof for supporting said base on a horizontal surface and engageable with inner portions of a spacer on which said base may be supported for preventing lateral movement of the base relative to said spacer, a carrier having a plurality of seats provided with horizontal surfaces engageable with the bottom of said projections on the bottom of a tray and provided with vertical surfaces extending upwardly therefrom engageable with the outer portions of said projections for holding the lowermost composite tray of a stack of said trays and roller means on said carrier for supporting it and the trays thereon for rolling movement.

References Cited in the file of this patent
UNITED STATES PATENTS

| | | |
|---|---|---|
| 814,178 | Waters | Mar. 6, 1906 |
| 1,010,801 | Rapp | Dec. 5, 1911 |
| 1,177,115 | Klenk | Mar. 28, 1916 |
| 1,301,031 | Bentley | Apr. 15, 1919 |
| 1,757,192 | Hothersall | May 6, 1930 |
| 2,083,259 | Guiter | June 8, 1937 |
| 2,428,500 | Nutt | Oct. 7, 1947 |
| 2,440,527 | Talley | Apr. 27, 1948 |
| 2,448,679 | Meinhardt | Sept. 7, 1948 |
| 2,452,356 | Coit | Oct. 26, 1948 |
| 2,457,841 | Smith et al. | Jan. 4, 1949 |
| 2,602,541 | Otten | July 8, 1952 |
| 2,620,997 | Lyon | Dec. 9, 1952 |